(No Model.)
C. THORP.
RAKE.
No. 394,521. Patented Dec. 11, 1888.
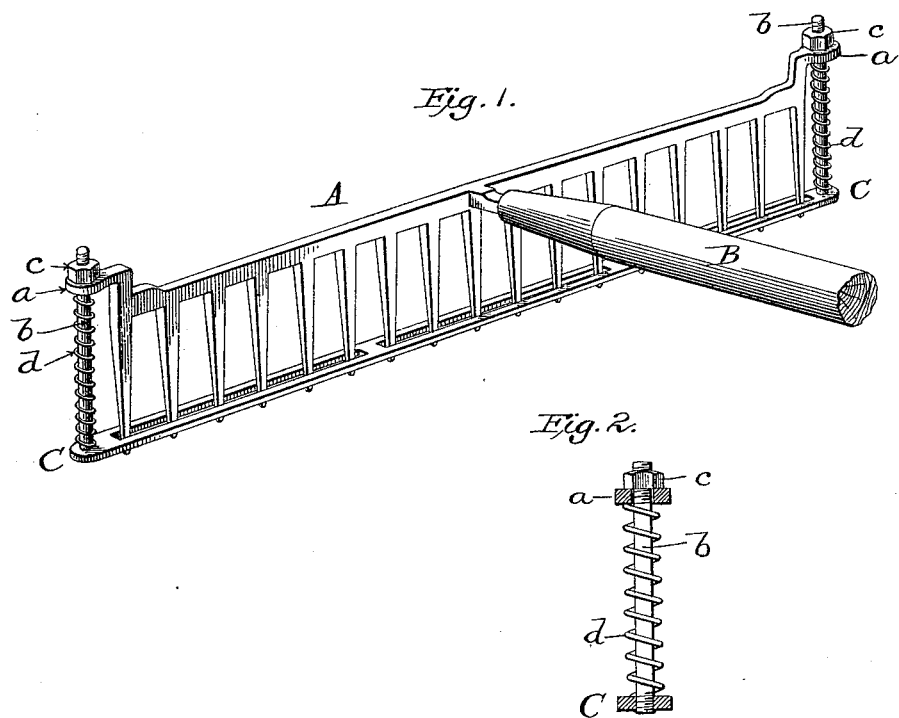
Witnesses:
James F. DuHamel
William H. Shipley
Inventor:
Charles Thorp,
by Dodge Sons,
Attys.

UNITED STATES PATENT OFFICE.

CHARLES THORP, OF TRENTON, DODGE COUNTY, WISCONSIN.

RAKE.

SPECIFICATION forming part of Letters Patent No. 394,521, dated December 11, 1888.

Application filed May 12, 1888. Serial No. 273,680. (No model.)

*To all whom it may concern:*

Be it known that I, CHARLES THORP, of Trenton, in the county of Dodge and State of Wisconsin, have invented certain new and useful Improvements in Rakes, of which the following is a specification.

My invention relates to automatic cleaning devices for rakes; and it consists in attaching said devices directly to the rake-head, instead of pivoting them to the handle of the rake, as has been customary.

In the accompanying drawings, Figure 1 is a perspective view of a rake having my improvements applied thereto, and Fig. 2 an enlarged detail view.

A indicates the rake-head, and B the handle, which parts may be of most any desired construction and pattern. The head may be made of wire or of cast or wrought iron or steel; but in any event it will be provided at opposite ends with laterally-extending ears $a$, which are perforated, as clearly shown in Fig. 2, to receive a stem or rod, $b$, attached at each end to the cleaning-bar C. This bar C may be made of wood, and in its preferred form is adapted to pass upon the front and rear faces of the rake-teeth, the separated arms of the cleaner-bar being connected at points between their ends in order to give strength and rigidity thereto.

It is obvious that one of the bars of the cleaner-rod C may be dispensed with, and, if desired, the other bar provided with a series of fingers which shall extend inward between the teeth of the rake. I do not wish, however, to limit myself to any particular construction of the cleaner-bar; but I prefer that shown in the drawings, as I believe it will be found to be most advantageous.

The stems or rods $b$ at opposite ends of the cleaner-bar are screwed, riveted, bolted, or otherwise secured in position thereon, and extend upward through and above the perforated ears $a$, where they are provided with nuts $c$, which prevent the cleaner-bar from dropping off the rake. Between the lower face of the perforated ears and the upper face of the cleaner-bar the stems or rods $b$ are encircled by springs $d$, which tend to keep the cleaner-bar down around the ends of the rake-teeth, the said springs being of such length as to permit the cleaner-bar to rise relatively to the rake-head as the material is gathered by the rake.

As the rake is lifted up, the springs will force the cleaner-bar downward toward the ends or points of the rake-teeth and disengage all matters which have accumulated.

While in the drawings I have shown the perforated ears $a$ as projecting lengthwise from the end of the rake, I do not wish to be understood as limiting myself to such an arrangement, as it is obvious that the said perforated ears may project either forwardly or backwardly.

It is obvious that the arrangement shown in Figs. 1 and 2 of the drawings may be reversed—that is to say, the stems or rods may be secured to the perforated ears and the cleaner-bar adapted to slide upon the stems or rods, in which case the nuts $c$ will be upon the under side of the cleaner-bar. This arrangement is not so good, however, as that shown, for the reason that the nuts are liable to become unscrewed from their stems or rods.

Having thus described my invention, what I claim is—

1. As an improved article of manufacture, a self-cleaning hand-rake provided with a spring-sustained cleaning-bar adapted to move relatively to the rake-head, and held normally at or near the points of the teeth and wholly independent of the handle.

2. In combination with the rake-head, a cleaner-bar independent of the handle applied to the rake-head, and springs interposed between the rake-head and the cleaner-bar.

3. In combination with the rake-head A, provided with the perforated ears $a$, the cleaner-bar C, provided with stems or rods $b$, and springs $d$ encircling the rods or stems and interposed between the bar C and the rake-head, as and for the purpose set forth.

4. In combination with the rake-head A, provided at each end with perforated ears $a$, cleaner-bar C, provided at each end with an upright stem or rod, $b$, a nut, $c$, applied to the upper ends of each of the rods, and springs $d$ encircling the rods, all substantially as shown.

5. In a cleaning attachment for rakes, the combination, with a rake-head, of a cleaner-bar independent of the handle applied to the rake-teeth and free to move relatively thereto, and springs interposed between the cleaner-bar and rake-head, all substantially as shown, whereby when the rake is lifted off the ground it will be automatically cleared of accumulated matters.

In witness whereof I hereunto set my hand in the presence of two witnesses.

CHARLES THORP.

Witnesses:
GARRETT S. TRIPP,
FLORENCE M. TRIPP.